(12) United States Patent
Fullerton et al.

(10) Patent No.: US 12,481,093 B2
(45) Date of Patent: Nov. 25, 2025

(54) LOW-EMISSIVITY FILM FOR ARTICLE OF PERSONAL PROTECTIVE EQUIPMENT

(71) Applicant: 3M INNOVATIVE PROPERTIES COMPANY, St. Paul, MN (US)

(72) Inventors: Robert Kyle Fullerton, Matthews, NC (US); William E. Parson, Indian Trail, NC (US); Darin K. Thompson, Huntersville, NC (US); Derek W. Roy, Waxhaw, NC (US); Judge W. Morgan, III, Oakboro, NC (US); Timothy J. Hebrink, Scandia, MN (US); Gregory F. King, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 331 days.

(21) Appl. No.: 18/212,580

(22) Filed: Jun. 21, 2023

(65) Prior Publication Data

US 2023/0417965 A1    Dec. 28, 2023

Related U.S. Application Data

(60) Provisional application No. 63/366,976, filed on Jun. 24, 2022.

(51) Int. Cl.
| | |
|---|---|
| *G02B 5/20* | (2006.01) |
| *A61F 9/02* | (2006.01) |
| *A62B 18/02* | (2006.01) |
| *A62B 18/08* | (2006.01) |
| *G02B 5/26* | (2006.01) |

(52) U.S. Cl.
CPC .............. *G02B 5/208* (2013.01); *A61F 9/022* (2013.01); *A61F 9/029* (2013.01); *A62B 18/08* (2013.01); *G02B 5/26* (2013.01); *A62B 18/02* (2013.01)

(58) Field of Classification Search
None
See application file for complete search history.

(56) References Cited

U.S. PATENT DOCUMENTS

| | | | |
|---|---|---|---|
| 6,030,671 A | 2/2000 | Yang et al. | |
| 7,744,951 B2 | 6/2010 | Varaprasad | |
| 9,034,459 B2 | 5/2015 | Condo et al. | |
| 10,723,101 B2 | 7/2020 | Shimizu | |
| 2020/0181975 A1 | 6/2020 | Padiyath et al. | |

FOREIGN PATENT DOCUMENTS

| | | | |
|---|---|---|---|
| WO | 2015171340 A1 | 11/2015 | |

*Primary Examiner* — Kristy A Haupt
(74) *Attorney, Agent, or Firm* — David B. Patchett; Jonathan V. Sry

(57) ABSTRACT

A low-emissivity film for an article of personal protective equipment (PPE) having a lens is provided. The low-emissivity film is configured to be attached to at least one of an inner surface and an outer surface of the lens. A low-emissivity coating for the article of PPE is also provided.

20 Claims, 13 Drawing Sheets

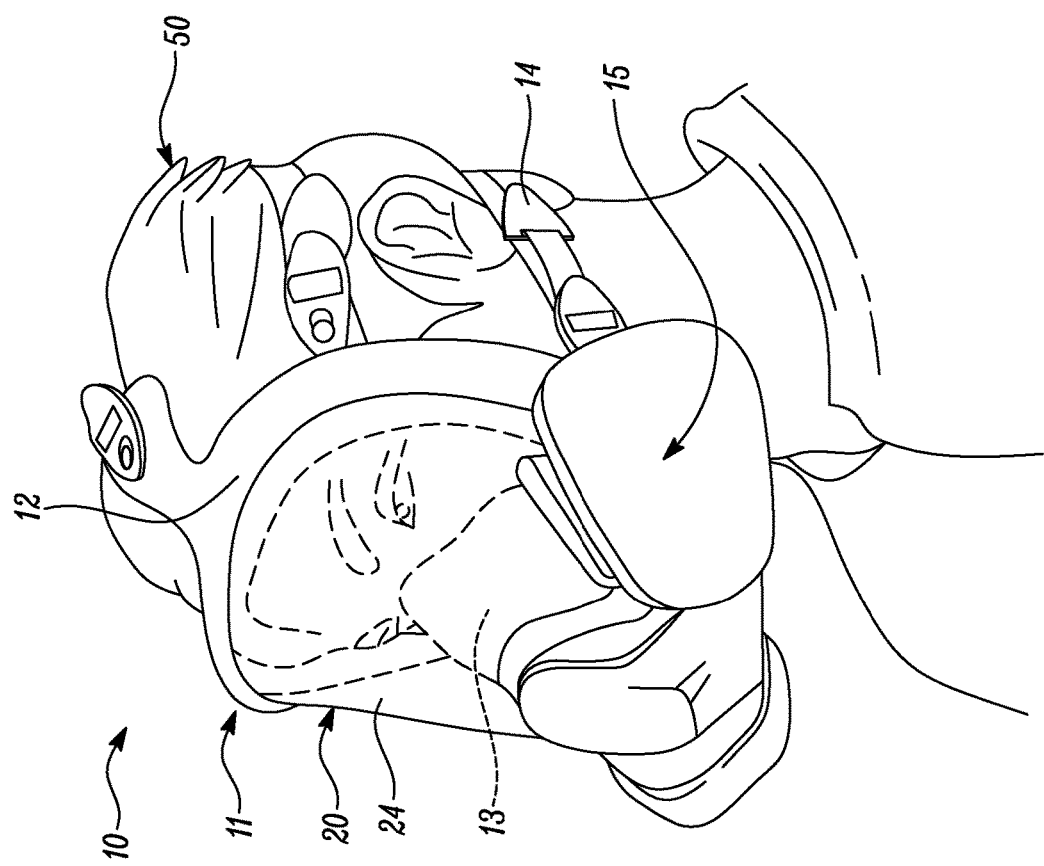

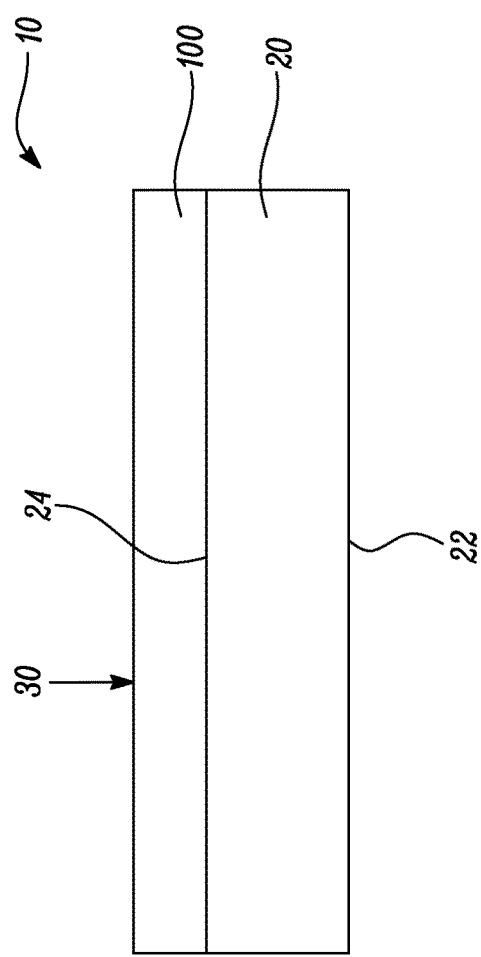
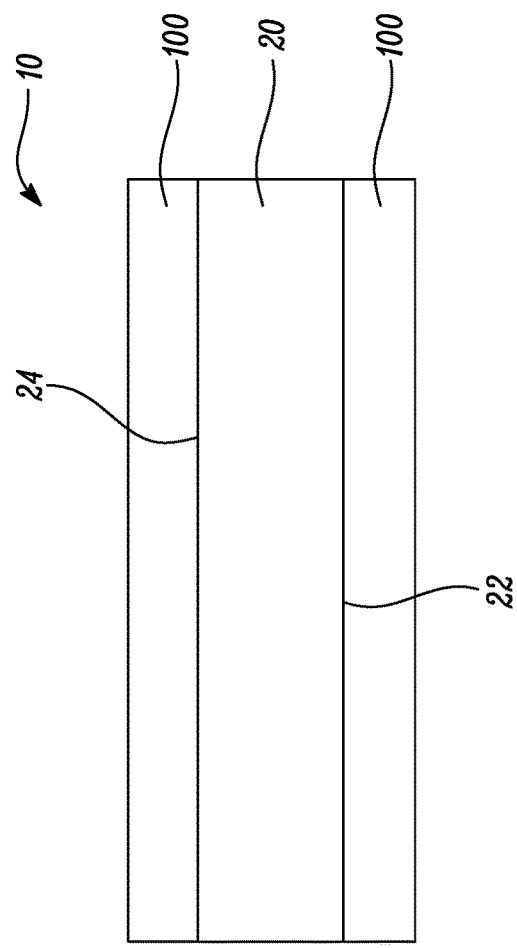
FIG. 2A
FIG. 2B

LOW-EMISSIVITY FILM FOR ARTICLE OF PERSONAL PROTECTIVE EQUIPMENT

CROSS REFERENCE TO RELATED APPLICATIONS

This application claims priority from U.S. Provisional Application Ser. No. 63/366,976, filed Jun. 24, 2022, the disclosure of which is incorporated by reference in its/their entirety herein.

TECHNICAL FIELD

The present disclosure relates generally to articles of personal protective equipment, and particularly to a low-emissivity film for an article of personal protective equipment.

BACKGROUND

Various types of articles of personal protective equipment (PPE), such as respirators, face shields, and the like, may be used to reduce exposure to hazards that may cause injuries and/or illnesses. For example, face shields may be worn by users when working with welding processes, molten glass sheet forming processes, molten metal sheet forming processes, and other furnaces. In another example, respirators may be worn by users who work in areas where air may be contaminated with toxic or noxious substances, such as airborne particulates, gases, and vapors. One type of such respirator is a full facepiece respirator.

Full facepiece respirators may fully cover a face of the users to provide improved protection thereto. However, the full facepiece respirators may cause the users to experience an increased sensation of heat when exposed to high radiant energy. Particularly, the users may experience the increased sensation of heat on an ocular region (i.e., a region proximal to eyes) and a forehead region. This may cause discomfort to the users during use of the full facepiece respirators. Similarly, the face shields may also cause discomfort to the users due to an increased sensation of heat experienced while wearing the face shields.

Therefore, there is a need to reduce discomfort experienced by the users while wearing articles of PPE, particularly during use of the articles of PPE when exposed to high radiant energy.

SUMMARY

In a first aspect, the present disclosure provides a low-emissivity film for an article of personal protective equipment (PPE) having a lens. The low-emissivity film is configured to be attached to at least one of an inner surface and an outer surface of the lens.

In a second aspect, the present disclosure provides an article of PPE. The article of PPE includes a lens including an inner surface and an outer surface opposing the inner surface. The article of PPE further includes a low-emissivity layer disposed on at least one of the inner surface and the outer surface of the lens.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Exemplary embodiments disclosed herein may be more completely understood in consideration of the following detailed description in connection with the following figures. The figures are not necessarily drawn to scale. In particular, thicknesses of certain layers in proportion to certain other items are exaggerated for ease of illustration and clarity purposes. Like numbers used in the figures refer to like components. However, it will be understood that the use of a number to refer to a component in a given figure is not intended to limit the component in another figure labeled with the same number.

FIG. 1A is a schematic perspective view of an article of personal protective equipment (PPE) worn by a user according to an embodiment of the present disclosure;

FIG. 2A is a schematic cross-sectional view of a portion of an article of PPE according to another embodiment of the present disclosure;

FIG. 2B is a schematic cross-sectional view of a portion of an article of PPE according to another embodiment of the present disclosure;

DETAILED DESCRIPTION

Figure 1B:
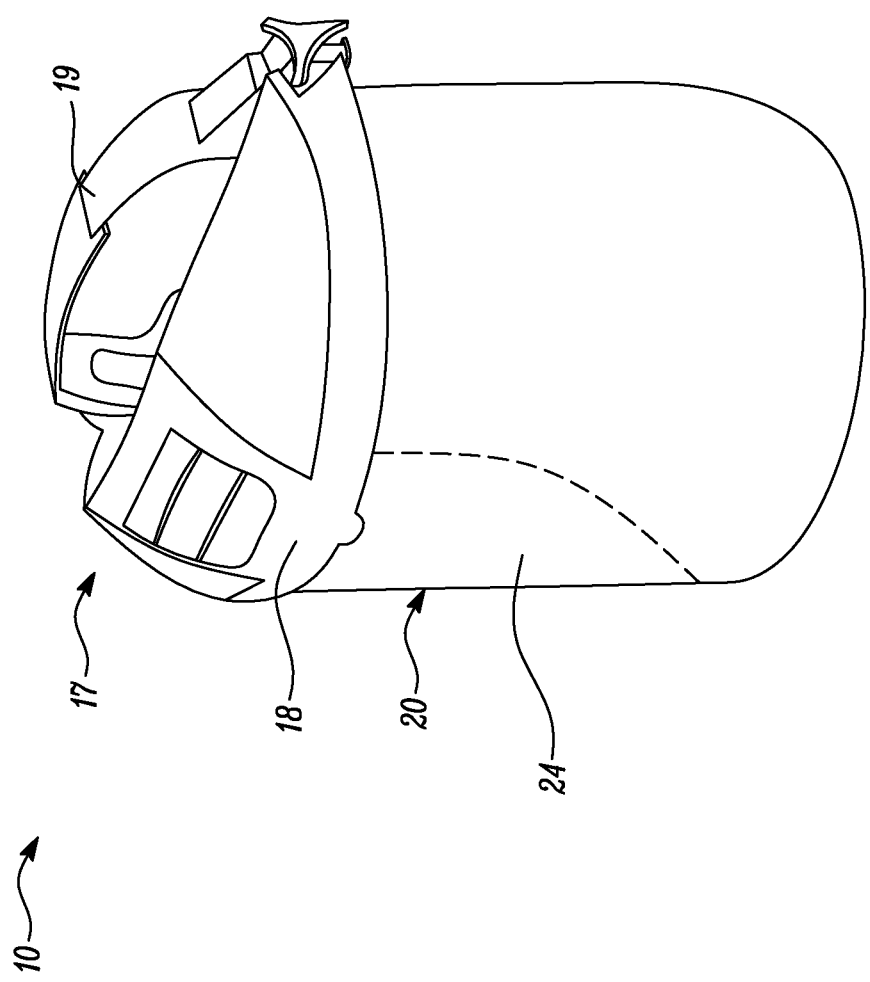
FIG. 1B is a schematic perspective view of an article of PPE according to another embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

In the following disclosure, the following definitions are adopted.

As recited herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

The term "about", unless otherwise specifically defined, means to a high degree of approximation (e.g., within +/−5% for quantifiable properties) but again without requiring absolute precision or a perfect match.

Terms such as same, equal, uniform, constant, strictly, and the like, are understood to be within the usual tolerances or measuring error applicable to the particular circumstance rather than requiring absolute precision or a perfect match.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, when a first material is termed as "similar" to a second material, at least 90 weight % of the first and second materials are identical and any variation between the first and second materials comprises less than about 10 weight % of each of the first and second materials.

As used herein, "at least one of A and B" should be understood to mean "only A, only B, or both A and B".

Unless specified or limited otherwise, the terms "attached," "connected," "coupled," and variations thereof, are used broadly and encompass both direct and indirect attachments, connections, and couplings.

As used herein, the term "adjacent" refers to elements that are in proximity to each other, usually in contact with each other, but may have intervening elements between them.

As used herein, the term "configured to" is at least as restrictive as the term "adapted to" and requires actual design intention to perform the specified function rather than mere physical capability of performing such a function.

As used herein, the term "article of personal protective equipment" or "article of PPE" refers to any article that can be worn by an individual for the purpose of preventing or decreasing personal injury or health hazard to the individual. In the context of the present disclosure, the article of PPE includes a lens and covers a face of the individual. Examples of such articles of PPE include face shields, full facepiece respirators, and the like.

As used herein, the term "inner surface" of a lens of an article of PPE refers to a surface of the lens that faces the user wearing the article of PPE. The term "outer surface" of the lens refers to a surface of the lens that faces a surrounding environment of the user wearing the article of PPE. The outer surface of the lens may be opposite to the inner surface of the lens.

The present disclosure relates to a low-emissivity film for an article of PPE having a lens. The low-emissivity film is configured to be attached to at least one of an inner surface and an outer surface of the lens.

In the context of the present disclosure, it has been surprisingly found that the low-emissivity film was able to substantially reflect a portion of infrared radiation produced by fire without melting, warping, or negatively affecting viewability through the lens.

The low-emissivity film may reduce a sensation of heat experienced by a user (e.g., a firefighter) on an ocular region (i.e., a region proximal to eyes) and a forehead region. Further, the low-emissivity film may substantially transmit visible radiation. The low-emissivity film may therefore reduce discomfort experienced by the user wearing the article of PPE without negatively affecting viewability through the lens.

Moreover, in some cases, the low-emissivity film may be removably attached to the lens. Therefore, the low-emissivity film may be replaced when required. For example, if the low-emissivity film gets dirty or damaged during or after use of the article of PPE, the low-emissivity film may be replaced with a new low-emissivity film.

Referring now to the Figures, FIG. 1A illustrates a schematic perspective view of an article of personal protective equipment (PPE) 10 worn by a user 50. The user 50 may be, for example, a firefighter, a first responder, a healthcare professional, a furnace worker, and the like.

The article of PPE 10 includes a lens 20. The lens 20 includes an inner surface 22 (shown in FIGS. 2A and 2B) and an outer surface 24 opposing the inner surface 22. The inner surface 22 may be a surface of the lens 20 facing the user 50, and the outer surface 24 may be a surface of the lens 20 facing the surrounding environment.

In the illustrated embodiment of FIG. 1A, the article of PPE 10 is a full facepiece respirator 11. The full facepiece respirator 11 may include a respirator body 12. The lens 20 may be coupled to the respirator body 12. The user 50 may perceive a surrounding environment through the lens 20.

The respirator body 12 may include a nose cup portion 13 configured to fit over a nose and a mouth of the user 50. The nose cup portion 13 may define a breathing zone around a nose and a mouth of the user 50 for delivering clean air to the user 50.

As shown in FIG. 1A, in some examples, the clean air may be air that is filtered by particle, gas, and/or vapor cartridges 15. In such examples, the full facepiece respirator 11 may be a standalone device. In some other examples, the clean air may be delivered to the user 50 by personal protective equipment (PPE), such as, for example, a self-contained breathing apparatus (SCBA), a powered air purifying respirator (PAPR), and the like via the full facepiece respirator 11. In such examples, the full facepiece respirator 11 may be a part of the PPE.

The full facepiece respirator 11 may further include a harness 14 coupled to the respirator body 12. The harness 14 may be configured to secure the respirator body 12 on a head of the user 50, such that the nose cup portion 13 covers the nose and the mouth of the user 50. The harness 14 may include any device or combination of elements for supporting the respirator body 12 on the user 50. For example, the harness 14 may include an adjustable head suspension system.

FIG. 1B illustrates a schematic perspective view of the article of PPE 10 according to another embodiment of the present disclosure.

As discussed above, the article of PPE 10 includes the lens 20. In the illustrated embodiment of FIG. 1B, the article of PPE 10 is a face shield 17. The face shield 17 may include a shield body 18. The lens 20 may be coupled to the shield body 18, and a user wearing the face shield 17 may perceive a surrounding environment through the lens 20.

The face shield 17 may include a suspension system 19 configurable to support the face shield 17 on a head of a user. The suspension system 19 may be adjustably coupled to the shield body 18. The face shield 17 may be worn by users that work, for example, with welding processes, molten glass sheet forming processes, molten metal sheet forming processes, and other furnaces.

FIGS. 2A and 2B illustrate schematic cross-sectional views of a portion of the article of PPE 10 according to different embodiments of the present disclosure.

Referring to FIGS. 2A and 2B, the article of PPE 10 further includes a low-emissivity layer 100 disposed on at least one of the inner surface 22 and the outer surface 24 of the lens 20. In other words, the low-emissivity layer 100 may be disposed on the inner surface 22, the outer surface 24, or each of the inner surface 22 and the outer surface 24.

In the illustrated embodiment of FIG. 2A, the article of PPE 10 includes the low-emissivity layer 100 disposed on the outer surface 24 of the lens 20. In the illustrated embodiment of FIG. 2B, the article of PPE 10 includes a pair of low-emissivity layers 100 disposed on the lens 20. Specifically, one of the pair of low-emissivity layers 100 is disposed on the outer surface 24 of the lens 20, and the other of the pair of low-emissivity layers 100 is disposed on the inner surface 22 of the lens 20.

The low-emissivity layer 100 may substantially reflect at least a portion of infrared radiation. Specifically, in some embodiments, for a normally incident light 30 having a wavelength in an infrared wavelength range extending from about 700 nm to about 4000 nm, the low-emissivity layer 100 reflects at least about 20% of the normally incident light 30. In some embodiments, for the normally incident light 30 having a wavelength in the infrared wavelength range, the low-emissivity layer 100 may reflect at least about 30%, at least about 40%, at least about 50%, or at least about 60% of the normally incident light 30. In some embodiments, for the normally incident light 30 having a mid-infrared wavelength range extending from about 2000 nm to about 4000 nm, the low-emissivity layer 100 may reflect greater than or equal to 60% of the normally incident light 30.

Therefore, the low-emissivity layer 100 may reflect at least a portion of radiant energy produced by, for example, fire. Consequently, the low-emissivity layer 100 may reduce a sensation of heat experienced by the user 50 on an ocular region (i.e., a region proximal to eyes) and a forehead region. The low-emissivity layer 100 may therefore reduce discomfort experienced by the user 50 wearing the article of PPE 10, particularly during use of the article of PPE 10 when exposed to high radiant energy.

As discussed above, the user 50 may perceive the surrounding environment through the lens 20. Therefore, the low-emissivity layer 100 may need to be substantially transparent to visible light. Specifically, in some embodiments, for the normally incident light 30 having a wavelength in a visible wavelength range extending from about 400 nm to about 700 nm, the low-emissivity layer 100 transmits at least about 50% of the normally incident light 30. In some embodiments, for the normally incident light 30 having a wavelength in the visible wavelength range, the low-emissivity layer 100 may transmit at least about 60% or at least about 70% of the normally incident light 30. Therefore, the low-emissivity layer 100 may not negatively affect viewability through the lens 20.

Figure 3A:
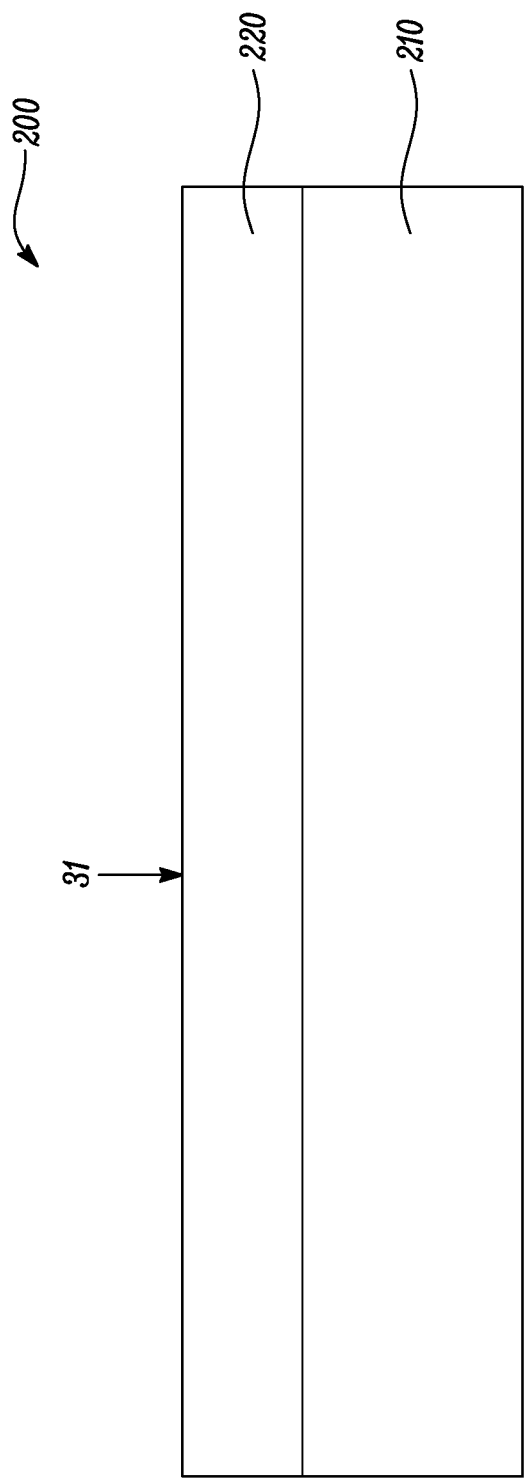
FIG. 3A is a schematic cross-sectional view of a low-emissivity film for the article of PPE of FIG. 1A or FIG. 1B according to an embodiment of the present disclosure.

In some embodiments, the low-emissivity layer 100 includes a low-emissivity film 200 (shown in FIG. 3A). In some other embodiments, the low-emissivity layer 100 may include a low-emissivity film 201 (shown in FIG. 3B). In some other embodiments, the low-emissivity layer 100 includes a low-emissivity coating 300 (shown in FIGS. 6A and 6B). The low-emissivity film 200, the low-emissivity film 201, and the low-emissivity coating 300 will be described in detail hereinafter.

FIG. 3A illustrates a schematic cross-sectional view of the low-emissivity film 200 for an article of PPE (e.g., the article of PPE 10 of FIG. 1A or 1B) according to an embodiment of the present disclosure.

Referring to FIGS. 1A to 3A, the low-emissivity film 200 is configured to be attached to at least one of the inner surface 22 and the outer surface 24 of the lens 20. In some embodiments, the low-emissivity film 200 is configured to be removably attached to the at least one of the inner surface 22 and the outer surface 24 of the lens 20. In other words, in some embodiments, the low-emissivity layer 100 includes the low-emissivity film 200 removably attached to the at least one of the inner surface 22 and the outer surface 24 of the lens 20. The low-emissivity film 200 may be configured to be removably attached to the at least one of the inner surface 22 and the outer surface 24 via an adhesive layer. Removably attaching the low-emissivity film 200 to the lens 20 may advantageously enable the low-emissivity film 200 to be replaced when required. For example, if the low-emissivity film 200 gets dirty or damaged during or after use of the article of PPE 10, the low-emissivity film 200 may be replaced with a new low-emissivity film 200.

In some embodiments, the low-emissivity film 200 includes a transparent substrate 210 and at least one reflective layer 220 disposed on the transparent substrate 210. The transparent substrate 210 may include a visible light-transmissive material, for example, polymers/plastics such as polyethylene terephthalate (PET). The at least one reflective layer 220 may include, for example, one or more metallic layers.

While not illustrated, the low-emissivity film 200 may further include one or more protective polymer layers (e.g., comprising crosslinked acrylate) disposed on the at least one reflective layer 220 for protection. It may be noted that the low-emissivity film 200 may have a multilayered structure and include various other layers, which are not shown in FIG. 3A. Suitable examples of the low-emissivity film 200 are disclosed in U.S. Patent Application 2020/0181975A1 to Padiyath et al., the disclosure of which is incorporated herein by reference.

Figure 3B:
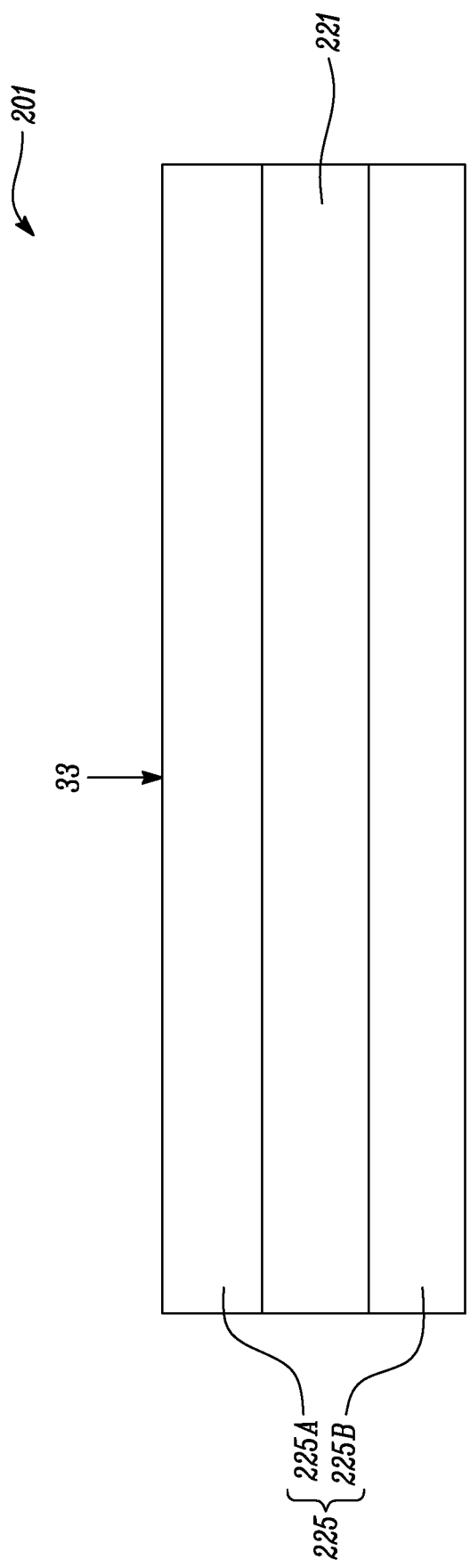
FIG. 3B is a schematic cross-sectional view of a low-emissivity film for the article of PPE of FIG. 1A or FIG. 1B according to another embodiment of the present disclosure.

FIG. 3B illustrates a schematic cross-sectional view of the low-emissivity film 201 for an article of PPE (e.g., the article of PPE 10 of FIG. 1A or 1B) according to an embodiment of the present disclosure.

In the illustrated embodiment of FIG. 3B, the low-emissivity film 201 includes a reflective layer 221 and a pair of oxide layers 225 sandwiching the reflective layer 221. Specifically, in the illustrated embodiment of FIG. 3B, the pair of oxide layers 225 includes a first oxide layer 225A and a second oxide layer 225B. The first and second oxide layers 225A, 225B are disposed on opposite sides of the reflective layer 221 and sandwich the reflective layer 221 therebetween.

The reflective layer 221 may include at least one of gold and silver. In other words, the reflective layer 221 may include gold, silver, or a combination thereof. Further, one of the pair of oxide layers 225 may include zinc-tin oxide, and the other of the pair of oxide layers 225 may include silicon oxide. For example, the first oxide layer 225A may include zinc-tin oxide, and the second oxide layer 225B may include silicon oxide. In an alternate example, the first oxide layer 225A may include silicon oxide, and the second oxide layer 225B may include zinc-tin oxide.

Referring to FIGS. 1A-2B and 3B, the low-emissivity film 201 may be configured to be attached to at least one of the inner surface 22 and the outer surface 24 of the lens 20 (e.g., via an adhesive layer). In some examples, the low-emissivity film 201 may be configured to be removably attached to the at least one of the inner surface 22 and the outer surface 24 of the lens 20. In some cases, upon attachment of the low-emissivity film 201 to the lens 20, the first oxide layer 225A may face the lens 20 and the second oxide layer 225B may face away from the lens 20. In some other cases, upon attachment of the low-emissivity film 201 to the lens 20, the second oxide layer 225B may face the lens 20 and the first oxide layer 225A may face away from the lens 20.

Figure 4A:
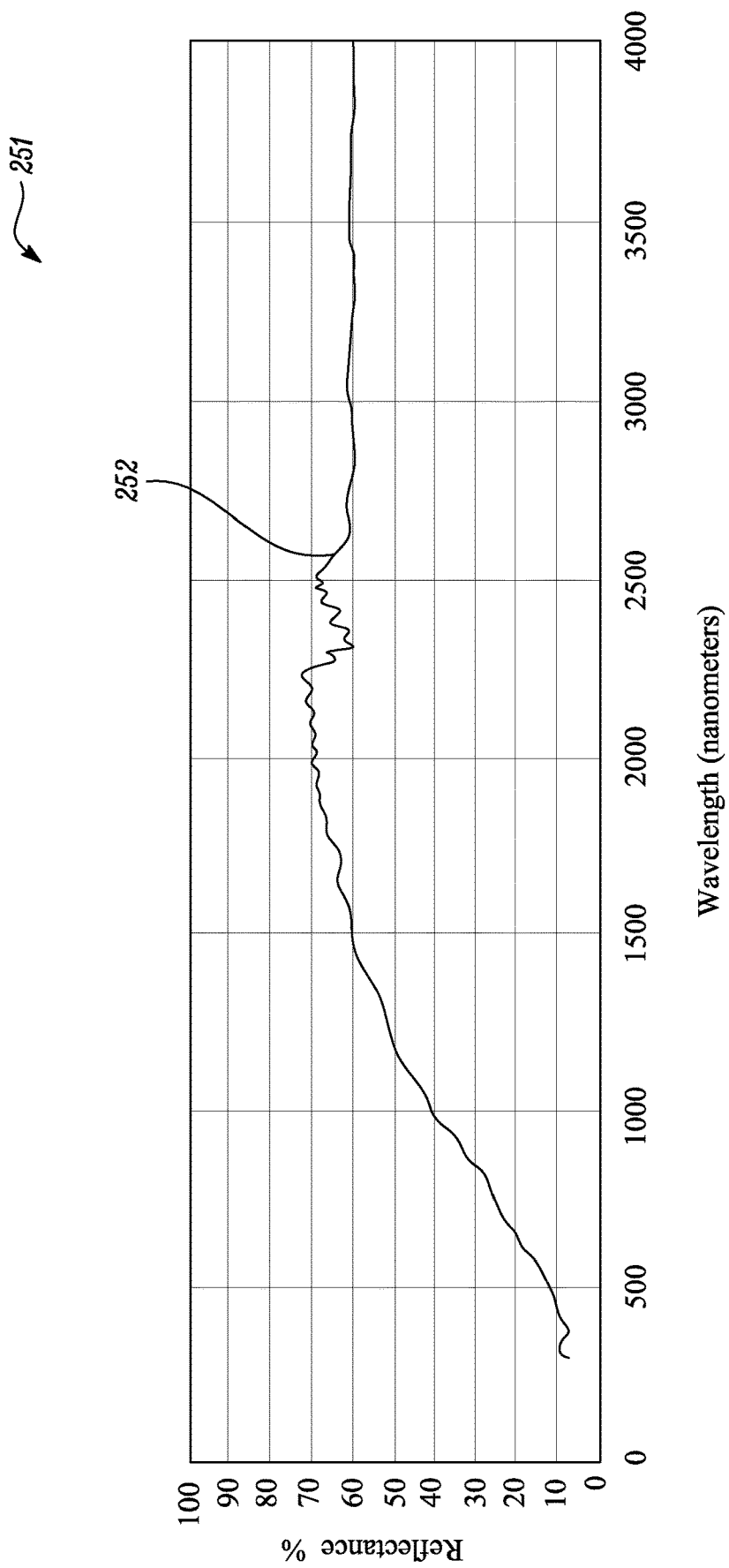
FIG. 4A is a graph depicting reflectance percentage versus wavelength of the low-emissivity films of FIGS. 3A and 3B according to an embodiment of the present disclosure.

FIG. 4A illustrates a graph 251 depicting reflectance percentage versus wavelength of the low-emissivity film 200 (shown in FIG. 3A) and the low-emissivity film 201 (shown in FIG. 3B) according to an embodiment of the present disclosure. Wavelength is expressed in nanometers (nm) in the abscissa (X-axis). Reflectance is expressed as reflectance percentage in the ordinate (Y-axis). The graph 251 includes a curve 252 depicting a variation of reflectance percentage versus wavelength of the low-emissivity film 200 and the low-emissivity film 201.

As depicted by the curve 252, in some embodiments, for a normally incident light 31 having a wavelength in an infrared wavelength range extending from about 700 nm to about 4000 nm, the low-emissivity film 200 reflects at least about 20% of the normally incident light 31. In some embodiments, for the normally incident light 31 having a wavelength in the infrared wavelength range, the low-emissivity film 200 reflects at least about 30%, at least about 40%, at least about 50%, or at least about 60% of the normally incident light 31.

In some embodiments, for a normally incident light 33 having a wavelength in an infrared wavelength range extending from about 700 nm to about 4000 nm, the low-emissivity film 201 may reflect at least about 20% of the normally incident light 33. In some embodiments, for the normally incident light 33 having a wavelength in the infrared wavelength range, the low-emissivity film 201 may reflect at least about 30%, at least about 40%, at least about 50%, or at least about 60% of the normally incident light 33.

Figure 4B:
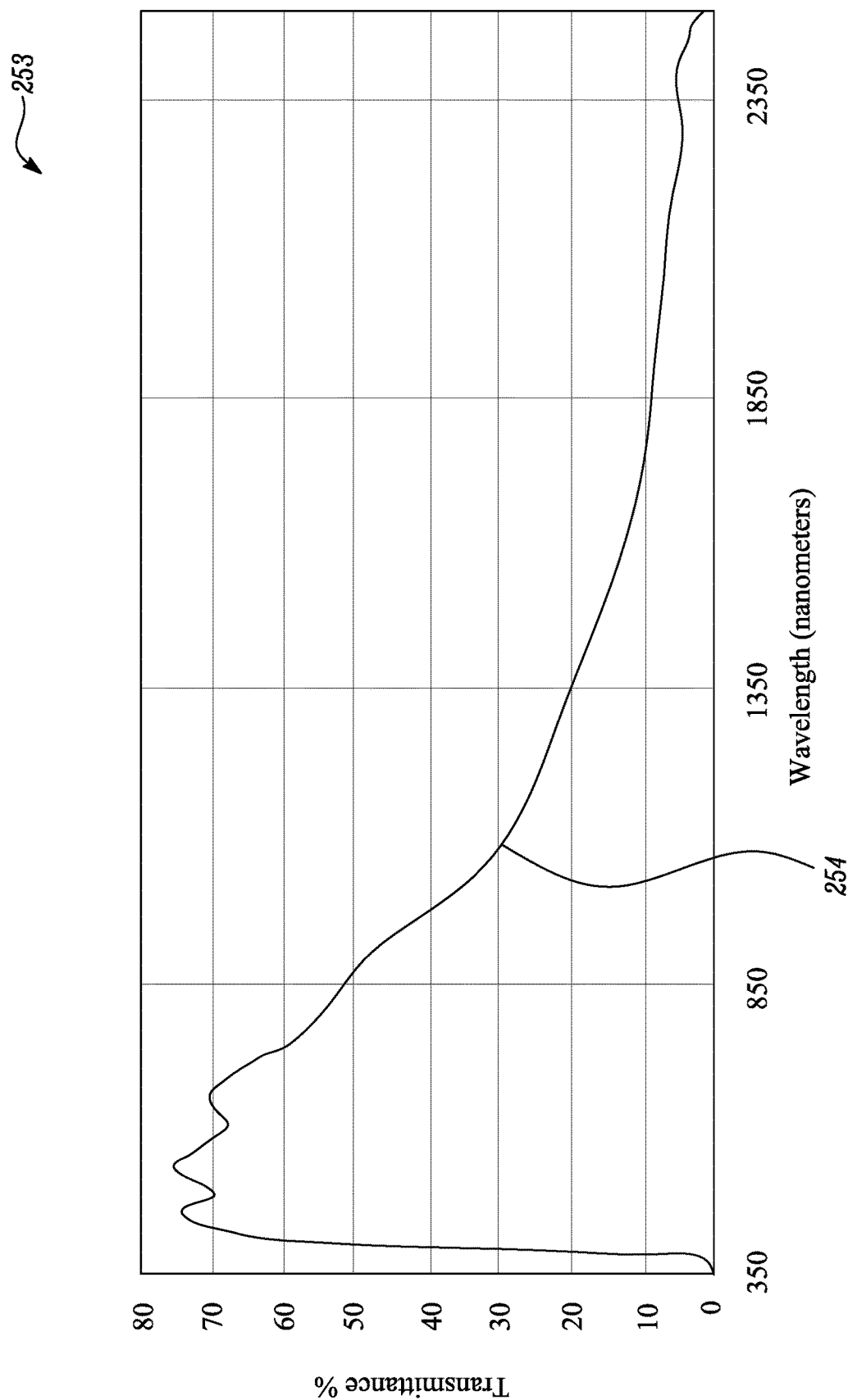
FIG. 4B is a graph depicting transmittance percentage versus wavelength of the low-emissivity films of FIGS. 3A and 3B according to an embodiment of the present disclosure.

FIG. 4B illustrates a graph 253 depicting transmittance percentage versus wavelength of the low-emissivity film 200 (shown in FIG. 3A) and the low-emissivity film 201 (shown in FIG. 3B) according to an embodiment of the present disclosure. Wavelength is expressed in nanometers (nm) in the abscissa (X-axis). Transmittance is expressed as transmittance percentage in the ordinate (Y-axis). The graph 253 includes a curve 254 depicting a variation of transmittance percentage versus wavelength of the low-emissivity film 200 and the low-emissivity film 201.

As depicted by the curve 254, in some embodiments, for the normally incident light 31 having a wavelength in a visible wavelength range extending from about 400 nm to about 700 nm, the low-emissivity film 200 transmits at least about 50% of the normally incident light 31. In some embodiments, for the normally incident light 31 having a wavelength in the visible wavelength range, the low-emissivity film 200 transmits at least about 60% or at least about 70% of the normally incident light 31.

In some embodiments, for the normally incident light 33 having a wavelength in a visible wavelength range extending from about 400 nm to about 700 nm, the low-emissivity film 201 may transmit at least about 50% of the normally incident light 33. In some embodiments, for the normally incident light 33 having a wavelength in the visible wavelength range, the low-emissivity film 201 may transmit at least about 60% or at least about 70% of the normally incident light 33.

As a result, the low-emissivity film 200 and/or the low-emissivity film 201 may be attached to the lens 20 (e.g., on the outer surface 24) to reduce discomfort experienced by the user 50 wearing the article of PPE 10 without negatively affecting viewability through the lens 20.

Figure 5B:
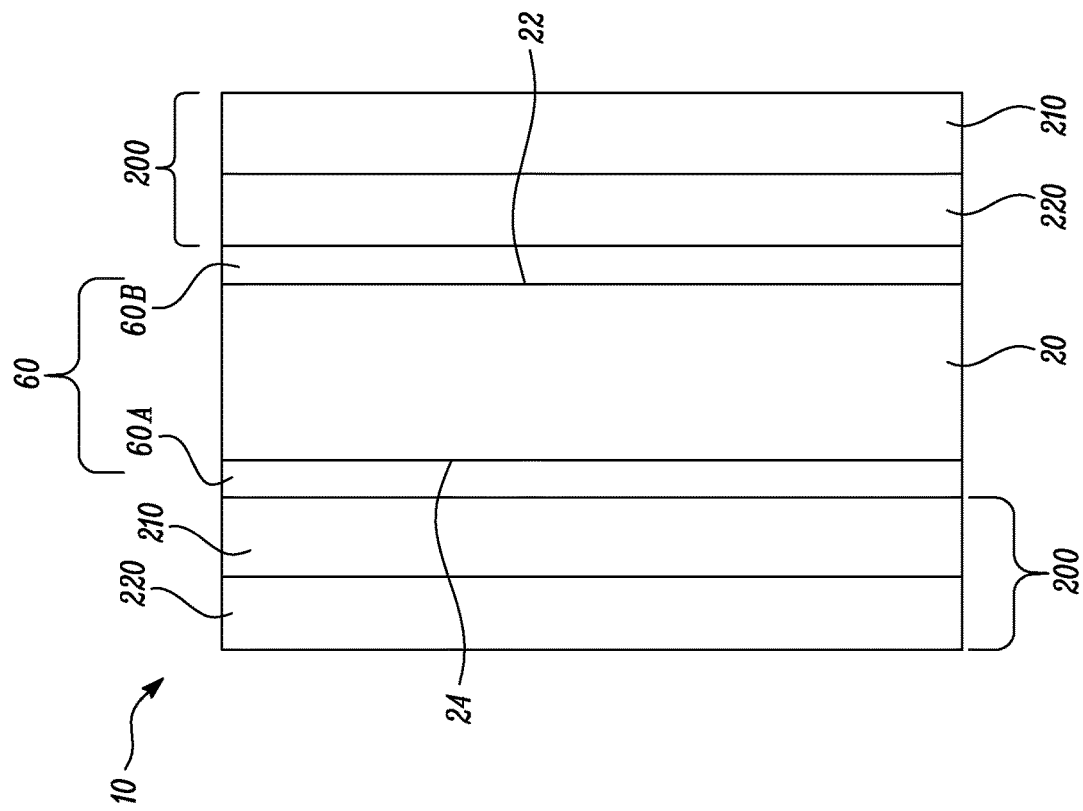
FIG. 5B is a schematic cross-sectional view of a portion of an article of PPE according to another embodiment of the present disclosure.
Figure 5A:
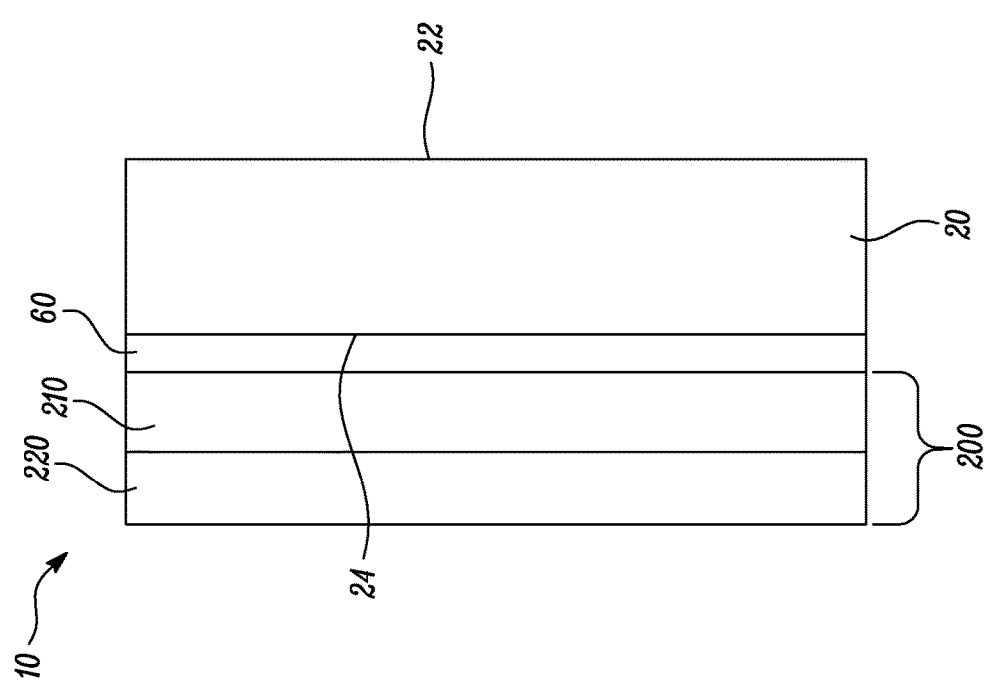
FIG. 5A is a schematic cross-sectional view of a portion of an article of PPE according to another embodiment of the present disclosure.

FIG. 5A illustrates a schematic cross-sectional view a portion of the article of PPE 10 according to an embodiment of the present disclosure.

As discussed above, in some embodiments, the low-emissivity film 200 includes the transparent substrate 210 and the at least one reflective layer 220 disposed on the transparent substrate 210. Further, in some embodiments, the low-emissivity film 200 is configured to be removably attached to the at least one of the inner surface 22 and the outer surface 24 via an adhesive layer.

In the illustrated embodiment of FIG. 5A, the article of PPE 10 further includes an adhesive layer 60 configured to removably attach the low-emissivity film 200 to the at least one of the inner surface 22 and the outer surface 24 of the lens 20.

In some embodiments, the transparent substrate 210 is configured to be removably attached to the outer surface 24 of the lens 20, such that transparent substrate 210 is disposed between the at least one reflective layer 220 and the lens 20. Specifically, in the illustrated embodiment of FIG. 5A, the transparent substrate 210 is removably attached to the outer surface 24 of the lens 20, such that transparent substrate 210 is disposed between the at least one reflective layer 220 and the lens 20. In the illustrated embodiment of FIG. 5A, the adhesive layer 60 is disposed on the outer surface 24 of the lens 20. The adhesive layer 60 may removably attach the transparent substrate 210 to the outer surface 24 of the lens 20, such that transparent substrate 210 is disposed between the at least one reflective layer 220 and the lens 20.

In some embodiments, the adhesive layer 60 includes a pressure sensitive adhesive. In some embodiments, the adhesive layer 60 may additionally or alternatively include a hot melt adhesive. Examples of suitable pressure sensitive adhesives include, but are not limited to, tackified or untackified materials such as tackified natural rubbers, tackified synthetic rubbers, tackified styrene block copolymers, self-tacky or tackified acrylate or methacrylate copolymers, self-tacky or tackified poly(alpha-olefins), and self-tacky or tackified silicones. Examples of suitable hot melt adhesives include, but are not limited to, hot melt adhesives based on polyester, ethylene vinyl acetate (EVA), polyamides, polyurethanes, and polyethers.

However, it may be noted that the adhesive layer 60 may have any suitable thickness, pattern, or composition as per desired application attributes. As shown in FIG. 5A, the adhesive layer 60 may be substantially uniform. Alternatively, in some embodiments, the adhesive layer 60 is patterned.

FIG. 5B illustrates a schematic cross-sectional view a portion of the article of PPE 10 according to an embodiment of the present disclosure.

Specifically, in the illustrated embodiment of FIG. 5B, the article of PPE 10 includes a pair of low-emissivity films 200.

One of the pair of low-emissivity films 200 is disposed on the inner surface 22 of the lens 20, and the other of the pair of low-emissivity films 200 is disposed on the outer surface 24 of the lens 20. The adhesive layer 60 may be further configured to removably attach the low-emissivity film 201 (shown in FIG. 3B) to the at least one of the inner surface 22 and the outer surface 24 of the lens 20.

In some embodiments, the transparent substrate 210 is configured to be removably attached to the outer surface 24 of the lens 20, such that transparent substrate 210 is disposed between the at least one reflective layer 220 and the lens 20. Specifically, in the illustrated embodiment of FIG. 5B, the transparent substrate 210 is removably attached to the outer surface 24 of the lens 20, such that transparent substrate 210 is disposed between the at least one reflective layer 220 and the lens 20. More specifically, in the illustrated embodiment of FIG. 5B, the article of PPE 10 further includes an adhesive layer 60A disposed on the outer surface 24 of the lens 20. The adhesive layer 60A may removably attach the transparent substrate 210 to the outer surface 24 of the lens 20, such that transparent substrate 210 is disposed between the at least one reflective layer 220 and the lens 20.

In some embodiments, the at least one reflective layer 220 is configured to be removably attached to the inner surface 22 of the lens 20, such that the at least one reflective layer 220 is disposed between the transparent substrate 210 and the lens 20. Specifically, in the illustrated embodiment of FIG. 5B, the at least one reflective layer 220 is removably attached to the inner surface 22 of the lens 20, such that the at least one reflective layer 220 is disposed between the transparent substrate 210 and the lens 20. More specifically, in the illustrated embodiment of FIG. 5B, the article of PPE 10 further includes an adhesive layer 60B disposed on the inner surface 22 of the lens 20. The adhesive layer 60B may removably attach the at least one reflective layer 220 to the inner surface 22 of the lens 20, such that the at least one reflective layer 220 is disposed between the transparent substrate 210 and the lens 20. As discussed above, the low-emissivity film 200 may further include the one or more protective polymer layers. In such cases, the one or more protective polymer layers may be removably attached to the inner surface 22 of the lens 20, such that the at least one reflective layer 220 is disposed between the transparent substrate 210 and the lens 20.

As discussed above, in some embodiments, the adhesive layer 60 includes a pressure sensitive adhesive. In some embodiments, the adhesive layer 60 may additionally or alternatively include a hot melt adhesive. In other words, in some embodiments, each of the adhesive layers 60A and 60B may include the pressure sensitive adhesive, the hot melt adhesive, or combinations thereof.

Figure 6A:
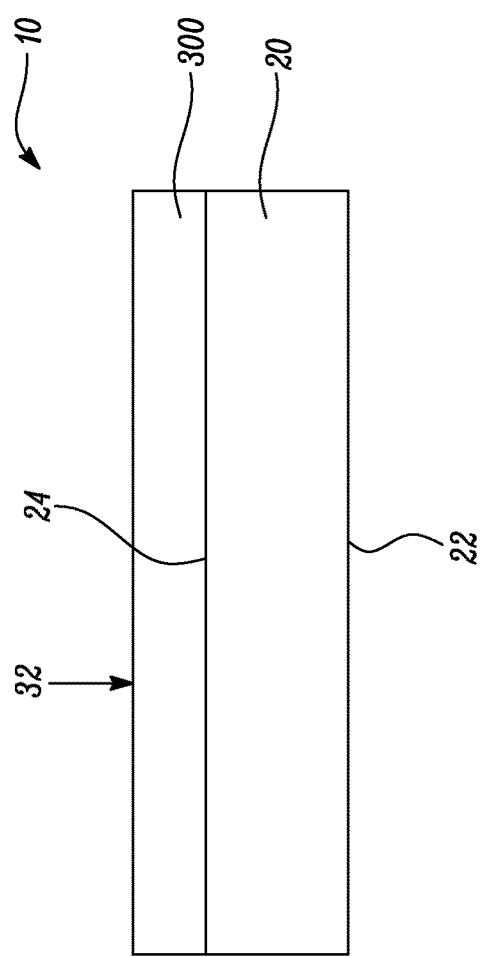
FIG. 6A is a schematic cross-sectional view of a portion of an article of PPE according to another embodiment of the present disclosure.
Figure 6B:
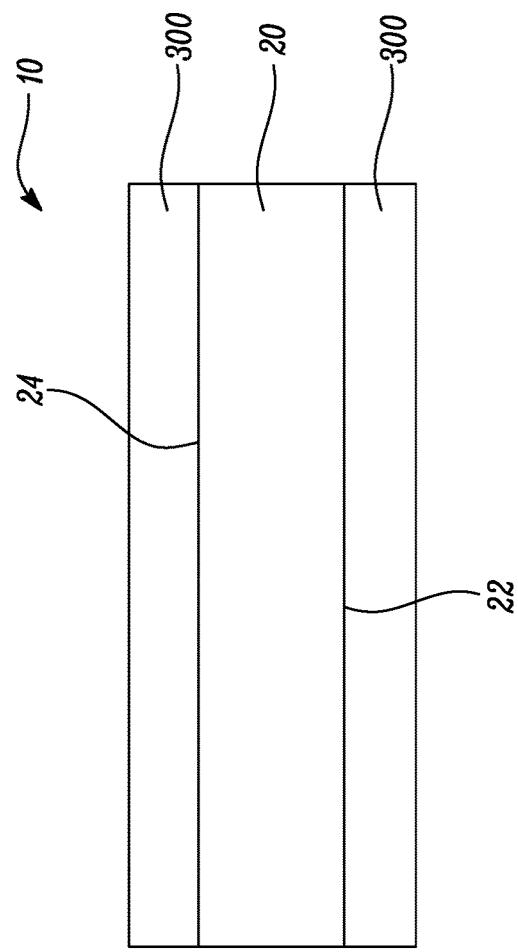
FIG. 6B is a schematic cross-sectional view of a portion of an article of PPE according to another embodiment of the present disclosure.

FIGS. 6A and 6B illustrate schematic cross-sectional views of a portion of the article of PPE 10 according to different embodiments of the present disclosure.

As discussed above, in some embodiments, the low-emissivity layer 100 includes the low-emissivity coating 300. In other words, the low-emissivity coating 300 may be disposed on the at least one of the inner surface 22 and the outer surface 24 of the lens 20. The low-emissivity coating 300 may be deposited on the lens 20 using any suitable technique, such as screen-printing, contact printing, dip coating, spray coating, lithography, or the like. In some embodiments, the low-emissivity coating 300 includes tin oxide (SnO), doped tin oxide, or silver (Ag).

In the illustrated embodiment of FIG. 6A, the article of PPE 10 includes the low-emissivity coating 300 disposed on the outer surface 24 of the lens 20. In some embodiments, for a normally incident light 32 having a wavelength in an infrared wavelength range extending from about 700 nm to about 4000 nm, the low-emissivity coating 300 may reflect at least about 20% of the normally incident light 32. In some embodiments, for the normally incident light 32 having a wavelength in the infrared wavelength range, the low-emissivity coating 300 may reflect at least about 30%, at least about 40%, at least about 50%, or at least about 60% of the normally incident light 32.

Further, in some embodiments, for the normally incident light 32 having a wavelength in a visible wavelength range extending from about 400 nm to about 700 nm, the low-emissivity coating 300 may transmit at least about 50% of the normally incident light 32. In some embodiments, for the normally incident light 32 having a wavelength in the visible wavelength range, the low-emissivity coating 300 may transmit at least about 60% or at least about 70% of the normally incident light 32.

The low-emissivity coating 300 may substantially reflect a portion of radiant energy and may not negatively affect viewability through the lens 20. In the illustrated embodiment of FIG. 6B, the low-emissivity coating 300 is disposed on each of the outer surface 24 and the inner surface 22 of the lens 20. Disposing the low-emissivity coating 300 on each of the outer surface 24 and the inner surface 22 of the lens 20 may provide improved reflection of infrared radiation.

Figure 7:
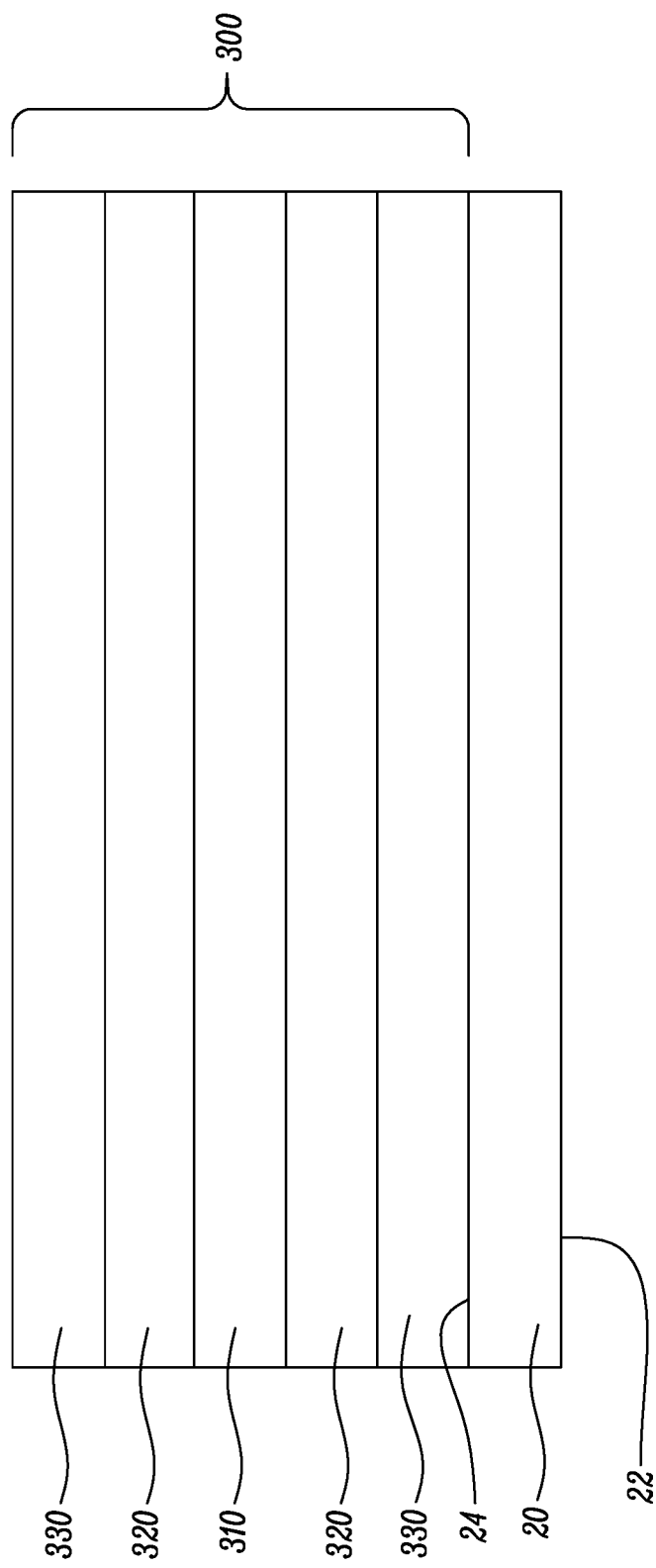
FIG. 7 is a schematic cross-sectional view of a portion of an article of PPE according to another embodiment of the present disclosure.

FIG. 7 illustrates a schematic cross-sectional view of the low-emissivity coating 300 according to an embodiment of the present disclosure. In the illustrated embodiment of FIG. 7, the low-emissivity coating 300 is disposed/deposited on the outer surface 24 of the lens 20.

In the illustrated embodiment of FIG. 7, the low-emissivity coating includes a first layer 310 and a pair of second layers 320 sandwiching the first layer 310 therebetween. In some embodiments, the first layer 310 includes silver (Ag). In some embodiments, each of the pair of second layers 320 includes nickel-chromium (NiCr).

In some embodiments, the low-emissivity coating 300 further includes a dielectric layer 330 disposed on at least one of the pair of second layers 320 opposite to the first layer 310. Specifically, in the illustrated embodiment of FIG. 7, the dielectric layer 330 is disposed on each of the pair of second layers 320 opposite to the first layer 310. In some embodiments, the dielectric layer 330 includes at least one of silicon nitride (SiN), indium tin oxide (ITO), and indium oxide (InO).

The low-emissivity coating 300 may be deposited on the lens 20 of any suitable article of PPE (e.g., the article of PPE 10 of FIG. 1A). Further, in some cases, if the low-emissivity coating 300 gets damaged during or after use of the article of PPE 10 (shown in FIG. 1A), the low-emissivity coating 300 may be partially or wholly redeposited on the lens 20.

EXPERIMENTAL RESULTS

Several experiments were performed to determine a performance benefit of a low-emissivity layer on an article of PPE, specifically, a full facepiece respirator.

Experiment 1

A first experiment was performed using equipment described in NIST Technical Note 1785. Specifically, a radiant panel that outputted 15 kW/m$^2$ (measured at a distance of 8 inches from the radiant panel) was used. A headform was positioned at a distance from the radiant panel to simulate a condition similar to that of a flashover chamber. Three thermocouples were attached to the headform/full facepiece respirator, as described in Table 1 below.

TABLE 1

Thermocouples and their locations

| Thermocouple | Location |
| --- | --- |
| First Thermocouple | Outer surface of lens |
| Second Thermocouple | On the ocular region of the headform |
| Third Thermocouple | At the nose cup of the full facepiece respirator |

The full facepiece respirator was exposed to the radiant panel for 9 minutes while PosiChek3 was used to simulate breathing at a rate of 40 liters/minute. The three thermocouples were monitored, and the measurements were recorded. After a baseline measurement with a full facepiece respirator without the low-emissivity film was recorded, a low-emissivity film was applied to an outer surface of the lens (e.g., as shown in FIG. 5A), and the experiment was re-run.

Figure 8:
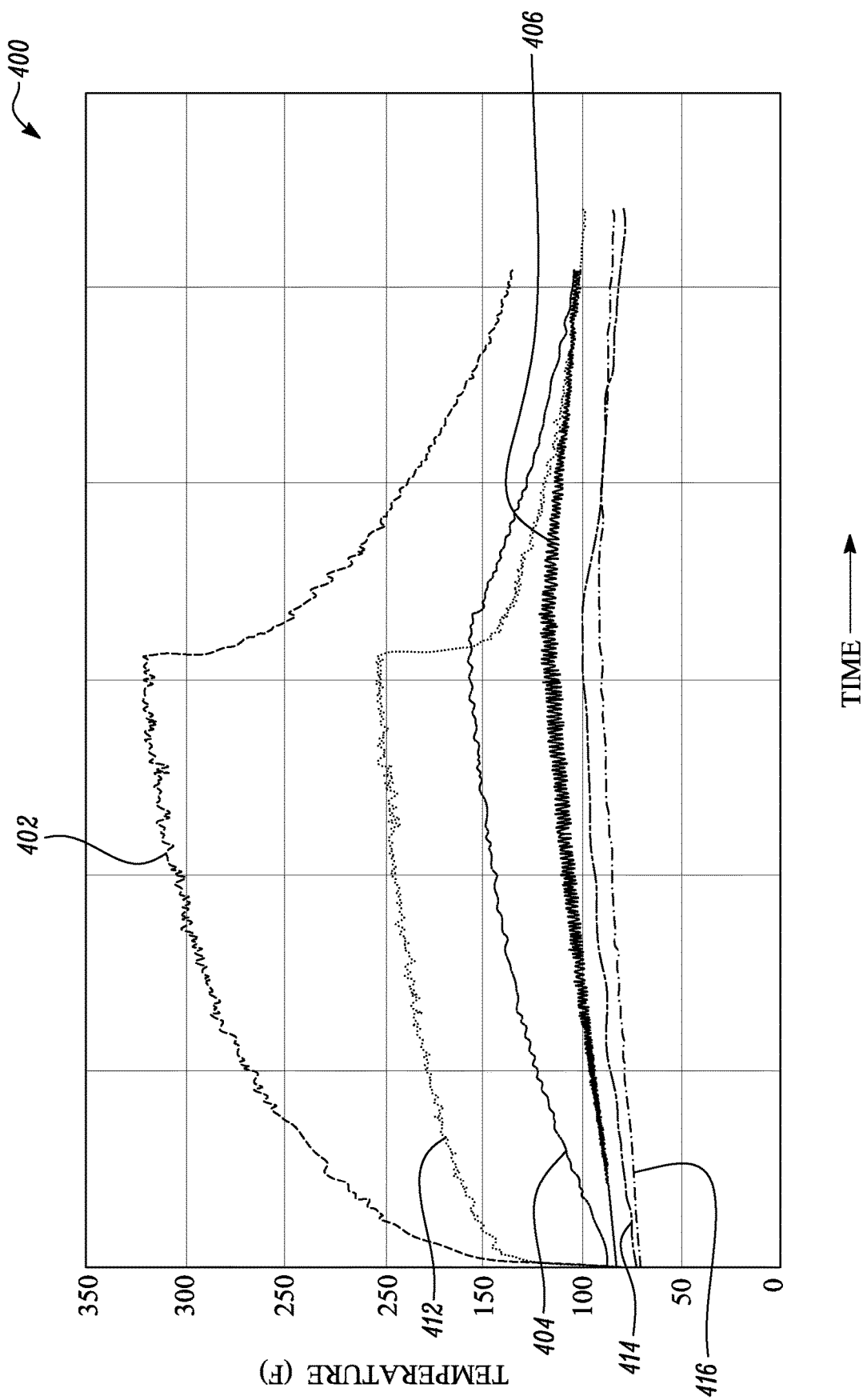
FIG. 8 is a graph depicting a variation of temperatures measured by three thermocouples with respect to time in a first experiment.

FIG. 8 illustrates a graph 400 depicting a variation of temperatures measured using the three thermocouples with respect to time in the first experiment.

The graph 400 includes a first curve 402, a second curve 404, and a third curve 406 representing the temperatures measured by the three thermocouples before the low-emissivity film was attached to the lens. Specifically, the first curve 402 represents the temperature measured by the first thermocouple (located on the outer surface of the lens), the second curve 404 represents the temperature measured by the second thermocouple (located on the ocular region of the headform), and the third curve 406 represents the temperature measured by the third thermocouple (located at the nose cup of the full facepiece respirator).

The graph 400 further includes a fourth curve 412, a fifth curve 414, and a sixth curve 416 representing the temperatures measured by the three thermocouples after the low-emissivity film was attached to the lens. The fourth curve 412 corresponds to the first thermocouple, the fifth curve 414 corresponds to the second thermocouple, and the sixth curve 416 corresponds to the third thermocouple.

As depicted by the second and fifth curves 404, 414, the application of the low-emissivity film on the lens resulted in a reduction in the temperature measured by the second thermocouple of about 50 degrees Fahrenheit. Therefore, it was observed that the low-emissivity film could be used to significantly reduce a sensation of heat experienced by a user wearing the full facepiece respirator, especially at the ocular region, when exposed to high radiant energy.

Experiment 2

A second experiment was performed using a flashover training aid. Participants donned full facepiece respirators with the three thermocouples attached to face of the participants/full facepiece respirators, as described in Table 1 above. The participants sat shoulder to shoulder in a flashover chamber, such that each full facepiece respirator was exposed to the same radiant load.

Each participant wore one full facepiece respirator without the low-emissivity film and one full facepiece respirator with the low-emissivity film applied to the outer surface of the lens (e.g., as shown in FIG. 5A). Measurements from the thermocouples were recorded for each participant and averaged.

Figure 9:
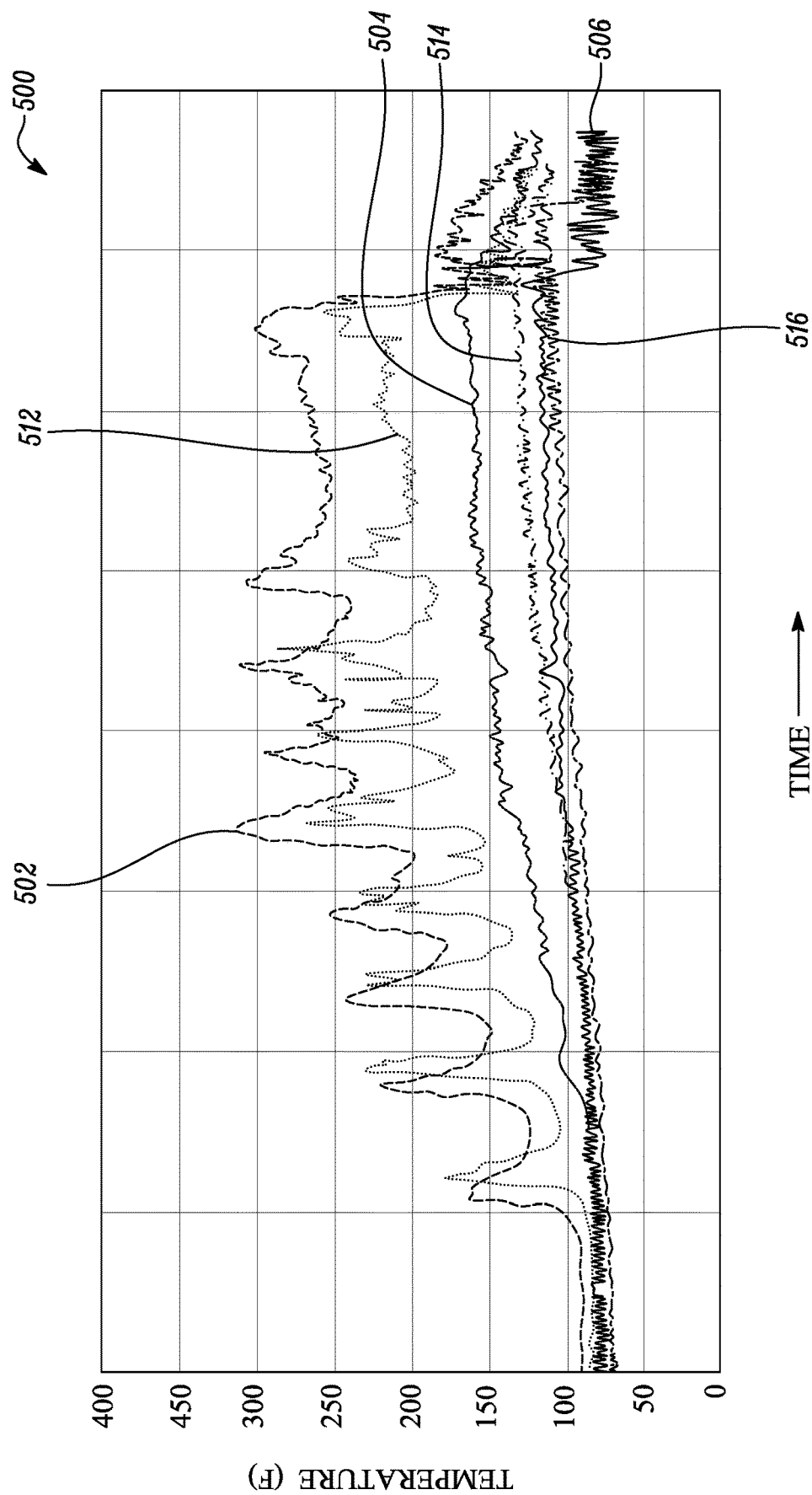
FIG. 9 is a graph depicting a variation of temperatures measured by three thermocouples with respect to time in a second experiment.

FIG. 9 illustrates a graph 500 depicting a variation of temperatures measured using the three thermocouples with respect to time in the second experiment.

The graph 500 includes a first curve 502, a second curve 504, and a third curve 506 representing the temperatures measured by the three thermocouples before the low-emissivity film was attached to the lens. Specifically, the first curve 502 represents the temperature measured by the first thermocouple (located on the outer surface of the lens), the second curve 504 represents the temperature measured by the second thermocouple (located on the ocular region of the participant), and the third curve 506 represents the temperature measured by the third thermocouple (located at the nose cup of the full facepiece respirator).

The graph 500 further includes a fourth curve 512, a fifth curve 514, and a sixth curve 516 representing the temperatures measured by the three thermocouples after the low-emissivity film was attached to the lens. The fourth curve 512 corresponds to the first thermocouple, the fifth curve 514 corresponds to the second thermocouple, and the sixth curve 516 corresponds to the third thermocouple.

As depicted by the second and fifth curves 504, 514, the application of the low-emissivity film on the lens resulted in a reduction in the temperature measured by the second thermocouple of about 40 degrees Fahrenheit. This further promoted the idea that the low-emissivity film could be used to significantly reduce the sensation of heat experienced by the user wearing the full facepiece respirator, especially at the ocular region, when exposed to high radiant energy.

Experiment 3

A third experiment was performed in which participants donned full facepiece respirators with the three thermocouples attached to face of the participants/full facepiece respirators, as described in Table 1 above. The participants stood shoulder to shoulder facing a large fire. Attempts were made to keep the fire consistent for about 10 minutes.

Each participant wore one full facepiece respirator without the low-emissivity film and one full facepiece respirator with the low-emissivity film attached to the outer surface of the lens (e.g., as shown in FIG. 5A). Measurements from the thermocouples were recorded for each participant and averaged.

Figure 10:
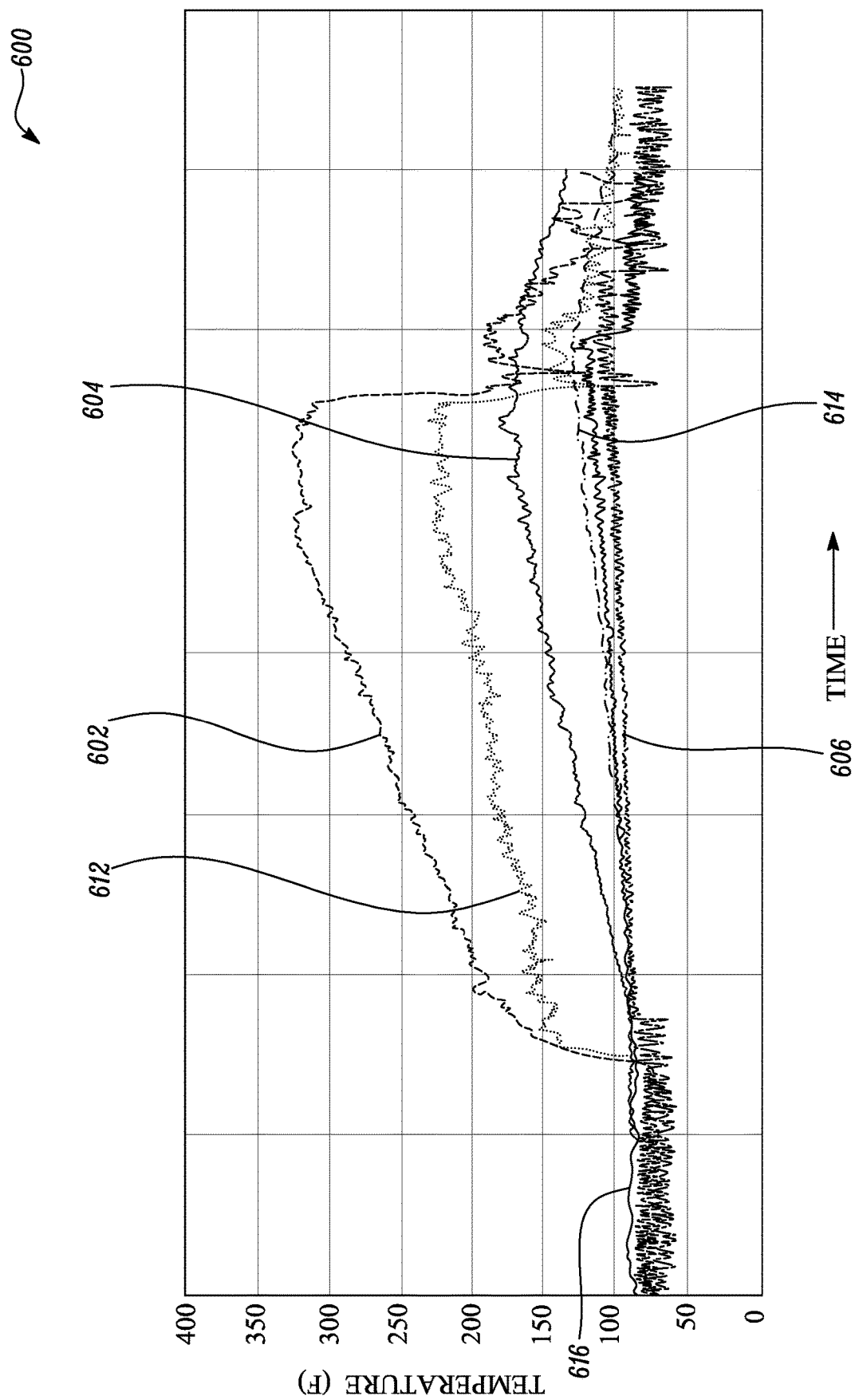
FIG. 10 is a graph depicting a variation of temperatures measured by three thermocouples with respect to time in a third experiment.

FIG. 10 illustrates a graph 600 depicting a variation of temperatures measured using the three thermocouples with respect to time in the third experiment.

The graph 600 includes a first curve 602, a second curve 604, and a third curve 606 representing the temperatures measured by the three thermocouples before the low-emissivity film was attached to the lens. Specifically, the first curve 602 represents the temperature measured by the first thermocouple (located on the outer surface of the lens), the second curve 604 represents the temperature measured by the second thermocouple (located on the ocular region of the participant), and the third curve 606 represents the temperature measured by the third thermocouple (located at the nose cup of the full facepiece respirator).

The graph 600 further includes a fourth curve 612, a fifth curve 614, and a sixth curve 616 representing the temperatures measured by the three thermocouples after the low-emissivity film was attached to the lens. The fourth curve 612 corresponds to the first thermocouple, the fifth curve 614 corresponds to the second thermocouple, and the sixth curve 616 corresponds to the third thermocouple.

As depicted by the second and fifth curves 604, 614, the application of the low-emissivity film on the lens resulted in a reduction in the temperature measured by the second thermocouple of about 45 degrees Fahrenheit.

Therefore, it was concluded that use of the low-emissivity on the full facepiece respirator can significantly reduce the sensation of heat experienced by the user wearing the full facepiece respirator, especially at the ocular region, when exposed to high radiant energy.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A low-emissivity film for an article of personal protective equipment (PPE) having a lens, wherein the low-emissivity film is configured to be attached to at least one of an inner surface and an outer surface of the lens.

2. The low-emissivity film of claim 1, wherein the low-emissivity film is further configured to be removably attached to the at least one of the inner surface and the outer surface via an adhesive layer.

3. The low-emissivity film of claim 1, wherein, for a normally incident light having a wavelength in a visible wavelength range extending from about 400 nm to about 700 nm, the low-emissivity film transmits at least about 50% of the normally incident light.

4. The low-emissivity film of claim 1, wherein, for a normally incident light having a wavelength in an infrared wavelength range extending from about 700 nm to about 4000 nm, the low-emissivity film reflects at least about 20% of the normally incident light.

5. The low-emissivity film of claim 1, further comprising a transparent substrate and at least one reflective layer disposed on the transparent substrate.

6. The low-emissivity film of claim 5, wherein the transparent substrate is configured to be removably attached to the outer surface of the lens, such that transparent substrate is disposed between the at least one reflective layer and the lens.

7. The low-emissivity film of claim 5, wherein the at least one reflective layer is configured to be removably attached to the inner surface of the lens, such that the at least one reflective layer is disposed between the transparent substrate and the lens.

8. The low-emissivity film of claim 1, further comprising:
a reflective layer comprising at least one of gold and silver; and
a pair of oxide layers sandwiching the reflective layer, wherein one of the pair of oxide layers comprises zinc-tin oxide, and wherein the other of the pair of oxide layers comprises silicon oxide.

9. The low-emissivity film of claim 1, wherein the article of PPE is a full facepiece respirator.

10. The low-emissivity film of claim 1, wherein the article of PPE is a face shield.

11. An article of personal protective equipment (PPE) comprising:
a lens comprising an inner surface and an outer surface opposing the inner surface; and
a low-emissivity layer disposed on at least one of the inner surface and the outer surface of the lens.

12. The article of PPE of claim 11, wherein the low-emissivity layer comprises a low-emissivity film removably attached to the at least one of the inner surface and the outer surface of the lens.

13. The article of PPE of claim 12, further comprising an adhesive layer configured to removably attach the low-emissivity film to the at least one of the inner surface and the outer surface of the lens.

14. The article of PPE of claim 13, wherein the adhesive layer comprises a pressure sensitive adhesive.

15. The article of PPE of claim 14, wherein the adhesive layer is patterned.

16. The article of PPE of claim 14, wherein the low-emissivity film comprises a transparent substrate and at least one reflective layer disposed on the transparent substrate.

17. The article of PPE of claim 11, wherein the low-emissivity layer comprises a low-emissivity coating.

18. The article of PPE of claim 17, wherein the low-emissivity coating comprises tin oxide (SnO), doped tin oxide, or silver (Ag).

19. The article of PPE of claim 17, wherein the low-emissivity coating comprises a first layer and a pair of second layers sandwiching the first layer therebetween, wherein the first layer comprises silver (Ag), and wherein each of the pair of second layers comprises nickel-chromium (NiCr).

20. The article of PPE of claim 19, wherein the low-emissivity coating further comprises a dielectric layer disposed on at least one of the pair of second layers opposite to the first layer, the dielectric layer comprising at least one of silicon nitride (SiN), indium tin oxide (ITO), and indium oxide (InO).

* * * * *